(12) United States Patent
Becker

(10) Patent No.: US 8,879,674 B2
(45) Date of Patent: Nov. 4, 2014

(54) SYSTEM AND METHOD FOR CORRELATING RECEIVED SIGNAL OVER TIME AND FREQUENCY

(71) Applicant: Hughes Network Systems, LLC, Germantown, MD (US)

(72) Inventor: Neal Becker, Frederick, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 13/860,509

(22) Filed: Apr. 10, 2013

(65) Prior Publication Data
US 2014/0029704 A1    Jan. 30, 2014

Related U.S. Application Data

(63) Continuation of application No. 13/018,670, filed on Feb. 1, 2011, now abandoned.

(51) Int. Cl.
*H03D 1/00* (2006.01)
*H04L 7/00* (2006.01)
*H04B 1/10* (2006.01)
*H04L 7/04* (2006.01)

(52) U.S. Cl.
CPC ............ *H04B 1/109* (2013.01); *H04L 7/042* (2013.01)
USPC .......... 375/343; 375/386; 370/479; 370/514; 370/515; 708/404; 708/405; 708/422; 708/424; 708/444

(58) Field of Classification Search
USPC .............. 375/343, 368; 370/479, 514, 515; 708/404, 405, 422, 424, 444
See application file for complete search history.

(56) References Cited

U.S. PATENT DOCUMENTS

| | | | |
|---|---|---|---|
| 5,272,446 A | 12/1993 | Chalmers et al. | |
| 6,263,031 B1 | 7/2001 | Beidas et al. | |
| 6,363,131 B1 * | 3/2002 | Beidas et al. | 375/368 |
| 7,130,293 B2 | 10/2006 | Hanada et al. | |
| 7,242,731 B2 | 7/2007 | Kontola et al. | |

(Continued)

FOREIGN PATENT DOCUMENTS

WO    WO 2006119816 A1 *    11/2006

OTHER PUBLICATIONS

Office Action from U.S. Appl. No. 13/018,670, mailed Oct. 10, 2012, 13 pages.*

*Primary Examiner* — Daniel Washburn
*Assistant Examiner* — Amneet Singh
(74) *Attorney, Agent, or Firm* — Potomac Technology Law, LLC

(57) ABSTRACT

An approach is provided for correlation of a signal over time and frequency. The signal is correlated with a bit sequence over time instances and certain frequency offsets, wherein sub-segments of the signal are correlated with sub-segments of the bit sequence to generate a correlation factor associated with each signal sub-segment. The correlation factors are coherently combined to generate a final correlation factor, wherein a respective phase shift (for each frequency offset) is applied to each correlation factor to generate a set of frequency adjusted correlation factors, and the frequency adjusted correlation factors of a respective set are combined to generate the final correlation factor over the signal sub-segments, resulting in the matrix of final correlation factors over time and frequency. A signal parameter estimation is performed, based on the matrix of final correlation factors, to determine a highest correlation value for the signal over the frequency offsets.

8 Claims, 7 Drawing Sheets

(56) References Cited

U.S. PATENT DOCUMENTS

| | | |
|---|---|---|
| 7,843,970 B2 | 11/2010 | Yang |
| 8,254,512 B2 | 8/2012 | Gaal et al. |
| 2001/0004380 A1* | 6/2001 | Mannermaa ................. 375/150 |
| 2003/0112911 A1* | 6/2003 | Barton et al. ................. 375/365 |
| 2003/0215005 A1* | 11/2003 | Kontola et al. ............... 375/149 |
| 2004/0196895 A1 | 10/2004 | Akopian |
| 2007/0206664 A1 | 9/2007 | Grant |
| 2008/0232484 A1 | 9/2008 | Budianu et al. |
| 2009/0323515 A1 | 12/2009 | Ishikura et al. |
| 2010/0172448 A1* | 7/2010 | Suberviola .................... 375/343 |
| 2010/0260294 A1* | 10/2010 | Zhengang et al. ............ 375/343 |

* cited by examiner

SYSTEM AND METHOD FOR CORRELATING RECEIVED SIGNAL OVER TIME AND FREQUENCY

RELATED APPLICATIONS

This application is a continuation, and claims the benefit of the filing date under 35 U.S.C. §120, of U.S. patent application Ser. No. 13/018,670 (filed 1, Feb. 2011), the entirety of which is incorporated herein by reference.

BACKGROUND

In some communications systems, a goal is the detection of a signal with some unknown parameters in noise. For example, in a burst-mode transmission, the start of the burst is often marked using some recognizable signal, or "Unique Word" (UW). This signal will typically arrive at the receiver with unknown (to a greater or less extent) timing, as well as unknown phase and frequency. The signal will also have been subjected to various impairments, such as additive white Gaussian noise (AWGN).

FIG. 1 illustrates a block diagram of a conventional communication system 100.

Communication system 100 includes a transmitter 102 and a receiver 104.

Receiver 104 receives information from transmitter 102 via a communication channel 106. Transmitter transmits a transmitted signal 108. Impairments to the reception of transmitted signal 108 by receiver 104 are generated by conditions denoted as impairment sources 110 external to transmitter 102 and receiver 104. Non-limiting examples of impairments include atmospheric noise, solar noise, cosmic noise, thermal noise, white noise, Gaussian noise and Doppler effect. Impairment sources 110 generate and inject impairments as denoted by an impairment 112. Interference by impairments 112 to transmitted signal 108 is modeled as additive as denoted by a noise addition element 114. Noise addition element 114 adds transmitted signal 108 and impairments 112 to generate a noisy signal 116. Receiver 104 receives and processes noisy signal 116. In order to receive and process noisy signal 116, receiver 104 performs processing steps, non-limiting examples of which include filtering, mixing and correlation.

FIG. 2 illustrates an example communications protocol 200 that is transmitted by conventional transmitter 102 (FIG. 1).

Communications protocol 200 includes a plurality of frames with a sampling denoted as a frame 204 and a frame 206.

Frame 204 and frame 206 are configured with respect to an x-axis 202 with units of time and resolution of seconds.

Transmission of frame 204 initiates at a time 208 and terminates at a time 210. Transmission of frame 206 initiates at a time 212 and terminates at a time 214.

Frame 204 includes a unique word 216 and a payload 218. Unique word provides a mechanism for receiver 104 to synchronize with frame 204. Payload 218 includes data and information desired by transmitter 102 to be received and processed by receiver 104. Transmission of unique word 216 initiates at time 208 and terminates at a time 220. Transmission of payload 218 initiates at time 220 and terminates at time 210.

Unique word 216 includes a plurality of symbols with a sampling denoted as a symbol 222 and a symbol 224. Transmission of symbol 222 initiates at time 208 and terminates at a time 226. Transmission of symbol 224 initiates at a time 228 and terminates at time 220. Payload 218 includes a plurality of symbols with a sampling denoted as a symbol 230 and a symbol 232. Transmission of symbol 230 initiates at time 220 and terminates at a time 234. Transmission of symbol 232 initiates at a time 236 and terminates at time 210.

Receiver 104 receives unique word 216 followed by payload 218. Receiver 104 knows in advance the symbol structure of unique word 216 and seeks to find unique word 216 by performing a correlation operation. Once a threshold has been met for the correlation operation, receiver 104 determines a starting time for the first symbol received of unique word 216, as denoted by time 208. Once receiver has determined the starting time for the initial symbol received, receiver 104 has also determined the initial time of reception for frame 204, as denoted by time 208. Receiver then uses the determination of time for initial reception of frame 204, as denoted by time 208, to synchronize and process the symbols of payload 218.

FIG. 3 illustrates a graph 302, a graph 304 and a graph 306 for explaining a conventional continuous correlation operation 300.

Conventional continuous correlation operation 300 may be described by the following:

$$\int y(t-\tau)x^*(t)dt \tag{1}$$

For equation (1), x and y represent general complex-valued signals and τ represents an estimate for the starting time of the received signal.

Graph 302 describes the characteristic of x or equation (1), graph 304 describes the characteristic of y of equation (1) and graph 306 describes the result of performing a correlation operation between x and y or graph 302 and graph 304.

Graph 302 includes an x-axis 308 with units of time in increments of seconds and a y-axis 310 with units of height. A function 312 initiates at a time 314 and terminates at a time 316. Function 312 has a height as designated by a height 318.

Graph 304 includes an x-axis 320 with units of time in increments of seconds and a y-axis 322 with units of height. A function 324 initiates at a time 326 and terminates at a time 328. Function 324 has a height as designated by a height 330.

Graph 306 includes an x-axis 332 with units of time in increments of seconds and a y-axis 334 with units of height. A function 336 represents the correlation of function 312 of graph 302 with function 324 of graph 304 as described by equation (1). Function 336 initiates at a time 338 and increases linearly to a point 340 at a time 342 with a maximum value as denoted by a maximum value 344. Following this, function 336 decreases linearly and terminates at a time 346 with a height of zero. A threshold value as denoted by a threshold height 350 crosses function 336 at a point 348 with x-axis 332 value as represented by a time 352 and also at a point 354 with x-axis 332 value as represented by a time 356.

For receiver 104, threshold height 350 represents a condition of a potential match between a received signal and an expected signal, as denoted between time 352 and time 356, with point 340 representing an exact match between a received signal and an expected signal. Receiver 104 uses correlation to determine when a received signal has matched an expected signal and then uses the timing information to decode and process received information from a received signal.

In the case of AWGN in particular, it is well known that a signal can be optimally detected by computing the correlation between the known transmitted signal and the received signal, and finding the value of time τ which maximizes the magnitude of the correlation as given by the following equation:

$$\hat{\tau} = \underset{\tau}{\operatorname{argmax}} \left\| \int y(t-\tau)x^*(t)dt \right\|^2 \quad (2)$$

Where x and y in equation (2) are in general complex-valued signals and τ is the estimate of the starting time of the received signal. The variable x describes a sequence of pre-determined symbols of a unique word and variable y represents a received sequence of symbols.

Typically digital sampled signals are being processed, and the correlation is replaced by the summation as shown below:

$$\hat{\tau} = nT \quad (3)$$

where $$n = \underset{n}{\operatorname{argmax}} \left\| \sum_{i=1}^{M} y_{i-n} x_i^* \right\|^2$$

For equation (3), T represents a sampling period.

In addition to unknown timing and phase, a received signal may also have unknown frequency offset, within a range. The frequency offset will cause a phase shift over the length of the received signal. This will cause the correlation to be reduced or negatively affected. The reduction in correlation may be described as:

$$\frac{1}{T} \int_{-T/2}^{T/2} \cos(2\pi f t) dt = \frac{\sin(\pi f \Gamma)}{\pi f \Gamma} \quad (4)$$

For equation (4), f represents a frequency offset and T represents the length of time for the correlation. As may be observed, if the frequency offset relative to the correlation length becomes large, the peak value of the correlation may be reduced and as a result of the reduction in correlation, the detection performance may be degraded.

Three solutions to problems applying correlation to received signals with a frequency offset have been applied. One solution is nearly optimal, but highly complex. The other two solutions are less complicated, but experience suboptimal performance.

The first solution discussed may be referred to as a "brute force" approach where a search is performed over time and frequency. Instead of performing a single correlation as shown above, a bank of correlators may be used. The input to each correlator may be referred to as a signal y which has been frequency shifted by some increment. The maximization is taken over all the correlation magnitude values. In the limit of continuous time and frequency, this may be described as equivalent to:

$$\hat{\tau} = \underset{f,\tau}{\operatorname{argmax}} \left\| \int y(t-\tau) e^{j2\pi ft} x^*(t) dt \right\|^2 \quad (5)$$

Typically, a discrete time and frequency approximation to (5) may be used as shown below:

$$\hat{\tau} = nT \quad (6)$$

where $$n = \underset{n,m}{\operatorname{argmax}} \left\| \sum_{i=1}^{M} y_{i-n} e^{j2\pi i m F} x_i^* \right\|^2$$

For equation (6), mF represents some multiple of frequency sampling interval F. While this approach may perform well, it has replaced a single correlation with a bank of correlations, one for each discrete frequency.

FIG. 4 illustrates a block diagram of a conventional brute force receiver portion 400.

Brute force receiver portion 400 includes a plurality of correlators with a sampling denoted as a correlator 402, a correlator 404 and a correlator 406, a plurality of magnitude portions with a sampling denoted as a magnitude portion 408, a magnitude portion 410 and a magnitude portion 412 and a maximum calculation portion 414.

Correlator 402, correlator 404 and correlator 406 receive a signal via a communication channel 416 from external to brute force receiver portion 400. Furthermore, correlator 402 receives a signal 418 representing a discrete frequency offset denoted as 1F. Correlator 404 receives a signal 426 representing a discrete frequency offset denoted as 2F. Correlator 406 receives a signal 432 representing a discrete frequency offset denoted as mF, where m represents a value of maximum increment for frequency offset F.

Magnitude portion 408 receives a signal 420 from correlator 402. Magnitude portion 410 receives a signal 428 from correlator 404. Magnitude portion 412 receives a signal 434 from correlator 406 and output a signal 424.

Correlator 402, correlator 404 and correlator 406 receives a signal via communication channel 416 for processing via a correlation algorithm. Magnitude portion 408, magnitude portion 410 and magnitude portion 412 receives correlated signals from correlator 402, correlator 404 and correlator 406, respectively, for performing a magnitude calculation. Finally, maximum calculation portion 414 receives a signal which has had a correlation calculation and magnitude calculation performed via a signal 422, a signal 430 and a signal 436. Maximum calculation portion 414 determines which received signal has the largest magnitude. The signal with the largest magnitude and a value larger than a certain threshold may then be processed for timing information for retrieving received data information as received via communication channel 416.

While application of the brute force correlation method may perform well, it has replaced a single correlation with a bank of correlations, one for each discrete frequency. In other words, a correlator may search for the entire Unique Word over all frequencies and all times. Application of the brute force correlation method is very expensive to implement, especially in environments where size, weight, power consumption and power dissipation are considered a premium, such as in satellite or military applications.

A second approach for processing a correlation of a received signal is to break the correlation into shorter correlation intervals, and then combine the outputs of these sub-intervals non-coherently as shown below:

$$\hat{\tau} = nT \quad (7)$$

where $$n = \underset{n}{\operatorname{argmax}} \left\{ \left\| \sum_{i=1}^{L} y_{i-n} x_i^* \right\|^2 + \left\| \sum_{i=1}^{2L} y_{i-n} x_i^* \right\|^2 + \ldots \right\}$$

FIG. 5 illustrates a block diagram of a conventional non-coherent receiver portion 500.

Conventional non-coherent receiver portion 500 includes a unique word portion 504, a plurality of sub-correlators with a sampling denoted as a sub-correlator 506, a sub-correlator 508 and a sub-corrclator 510, a plurality of delay portions with a sampling denoted as a delay portion 512, a delay portion 514 and a delay portion 516, a plurality of magnitude portions with a sampling denoted as a magnitude portion 518, a magnitude portion 520 and a magnitude portion 522 and a summation portion 524.

Sub-correlator 506 receives a signal from a communication channel 526 and receives a signal 552 from unique word portion 504. Magnitude portion 518 receives a signal 528 from sub-correlator 506. Delay portion 512 receives a signal from communication channel 526. Sub-correlator 508 receives a signal 532 from delay portion 512 and a signal 550 from unique word portion 504. Magnitude portion 520 receives a signal 534 from sub-correlator 508. Delay portion 514 receives signal 532 from delay portion 512. Delay portion 516 receives a signal 538 generated from a plurality of delay portions. Sub-correlator 510 receives a signal from delay portion 516 via a signal 540 and from unique word portion 504 via a signal 548. Magnitude portion 522 receives a signal 542 from sub-correlator 510. Summation portion 524 receives a signal from magnitude portion 518 via a signal 530, from magnitude portion 520 via a signal 536, from magnitude portion 522 via a signal 544 and from a plurality of other magnitude portions not shown.

Unique word portion 504 includes a plurality of unique word sub-portions with a sampling denoted as a unique word sub-portion 554, a unique word sub-portion 556 and a unique word sub-portion 558. Unique word sub-portion 554 includes a plurality of symbols with a sampling denoted as a symbol 560 and a symbol 562. Unique word sub-portion 556 includes a plurality of symbols with a sampling denoted as a symbol 564 and a symbol 566. Unique word sub-portion 558 includes a plurality of symbols with a sampling denoted as a symbol 568 and a symbol 570.

Unique word portion 504 is configured with respect to an x-axis 502 with units of time and resolution of seconds. Unique word portion 504 represents a predetermined sequence of symbols to be received in order to perform synchronization, decoding and processing. Symbols of unique word sub-portions correspond to a relation with respect to x-axis 502 for order of transmission and arrival. For example symbol 560 of unique word sub-portion 554 may be considered the first symbol to be received for a frame of data provided from a transmitter, whereas, symbol 570 of unique word sub-portion 558 may be considered the last received symbol for the unique word portion of a frame with payload symbols to follow.

Sub-correlator 506 receives a signal via communication channel 526 and performs a correlation of the received signal with the symbols received from unique word sub-portion 558. Sub-correlator 508 receives a delayed signal from communication channel 526 via delay portion 512 and performs a correlation of the delayed received signal with the symbols of unique word sub-portion 556. Sub-correlator 510 receives a multiplied delayed signal from communication channel 526 and performs a correlation of the delayed received signal with the symbols of unique word sub-portion 554.

Magnitude portion 518 receives a signal from sub-correlator 506 and performs a magnitude calculation. Magnitude portion 520 receives a signal from sub-correlator 508 and performs a magnitude calculation. Magnitude portion 522 receives a signal from sub-correlator 510 and performs a magnitude calculation. Summation portion 524 receives a set of magnitude calculations from magnitude portion 518, magnitude portion 520, magnitude portion 522 and a plurality of other magnitude portions not shown and performs a summation calculation. The summation calculation may be compared to threshold in order to determine if a unique word has been received as denoted by the configuration of unique word portion 504. Once the threshold has been achieved, the signal received via communication channel 526 may then be processed for timing information for retrieving received data information as received via communication channel 526.

With the conventional non-coherent receiver approach, a single correlator may be required, however the drawback is that the performance of the correlator in noisy conditions is degraded due to the non-coherent summation performed for the sub-correlations.

A third approach for processing a correlation of a received signal is to apply differential detection. For differential detection, a differential detection operation is performed on the received sequence of symbols to form a new sequence described as:

$$y'_i = y_i y^*_{i-1} \quad (8)$$

The new sequence is then correlated with an expected differential sequence described as:

$$x'_i x = x_i x^*_{i-1} \quad (9)$$

FIG. 6 illustrates a block diagram of a conventional differential detection receiver portion 600.

Conventional differential detection receiver portion 600 includes a delay 602, a differential portion 604, a unique word portion 606, a delay 608, a differential portion 610 and a correlator 612.

Delay 602 receives a signal via a communication channel 614. Differential portion 604 receives a signal from communication channel 614 and a delayed version of the signal from delay 602 via a signal 616. Delay 608 receives a signal 620 from unique word portion 606. Differential portion 610 receives a signal 622 from unique word portion 606 and a delayed or shifted version of unique word from delay 608 via a signal 624. Correlator portion 612 receives a received differential signal from differential portion 604 via a signal 618 and an expected differential signal from differential portion 610 via a signal 626. Correlator 612 provides a signal external to conventional differential detection receiver portion 600 via signal 618.

Unique word portion 606 provides storage for an expected unique word to be received via communication channel 614. Delay 608 provides a delayed or shifted version of unique word portion 606. Differential portion 610 performs a differential operation on the unique word stored in unique word portion 606 and a delayed or shifted version of the unique word stored in unique word portion 606. Delay 602 provides a delayed version of the signal received via communication channel 614. Differential portion 604 performs a differential operation on the signal received via communication channel 614 and the delayed version of the signal received from delay 602. Correlator 612 performs a correlation operation on the differential operation performed on the unique word stored in unique word portion 606 and the differential operation performed on the signal received via communication channel 614 and the delayed version of the signal received via communication channel 614.

Signal 628 generated by correlator 612 is compared to a threshold in order to determine if a unique word has been received as denoted by the configuration of unique word portion 606. Once the threshold has been achieved, the signal received via communication channel 614 is then processed for timing information for retrieving received data information as received via communication channel 614.

An advantage of the conventional differential detection approach is that it is inherently insensitive to issues related to frequency offsets. However, the drawback to this approach is it can suffer a significant performance loss due to the differential detection step. Furthermore, the losses due to differential detection increase as the signal-to-noise ratio decreases.

What is needed is a system and method for optimally or near optimally detecting and decoding information embedded in a signal without necessitating a large number of correlator banks for implementation.

BRIEF SUMMARY

The present invention provides a system and method for nearly optimal performance for searching a signal over both time and frequency, and for decoding and processing information embedded within the received signal.

In accordance with an aspect of the present invention, a system and method is provided for use with a frequency band including a transmission frequency and a received frequency. The transmission frequency includes a transmission signal having a transmitted unique word therein. The received frequency includes a received signal having a received unique word therein, wherein the received unique word had been received at a received time and at a received phase. The system includes a first sub-correlator, a second sub-correlator and a discrete Fourier transform device. The first sub-correlator can perform a first correlation of only a first portion of the received unique word with a corresponding first portion of the transmitted unique word over a plurality of instances of time and can output a first plurality of sub-correlation values. The second sub-correlator can perform a second correlation of only a second portion of the received unique word with a corresponding second portion of the transmitted unique word over the plurality of instances of time and can output a second plurality of sub-correlation values. The discrete Fourier transform device can perform a discrete Fourier transform over a plurality of frequencies within the frequency band on the first plurality of sub-correlation values and can perform a discrete Fourier transform over the plurality of frequencies within the frequency band on the second plurality of sub-correlation values. The first portion of the received unique word is different from the second portion of the received unique word.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
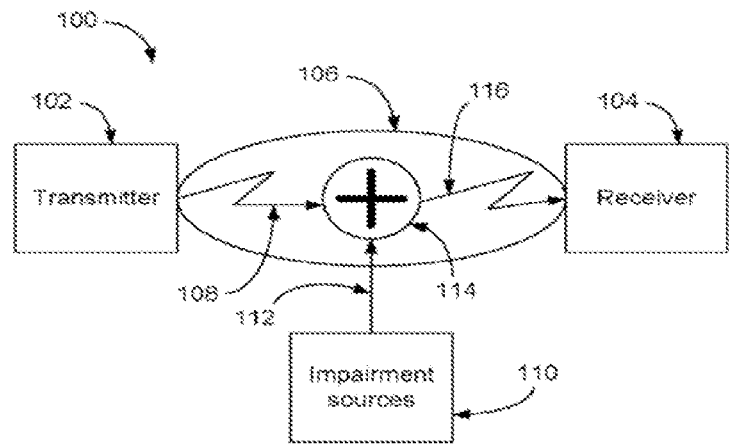
FIG. 1 illustrates a block diagram of a conventional communication system.

Generally a demodulator receives a waveform and outputs either hard decisions, i.e., binary 1 and binary 0, or outputs soft decisions, values determined to be either a binary 1 and binary 0. In particular, a burst-mode demodulator includes two functions: first, it estimates parameters needed to decode a signal, e.g., time of the burst, frequency of the burst, phase, etc.; and then 2) using the estimates, there is a demodulation process, e.g, similar to a continuous mode demodulation. Aspects of the present invention are drawn to the first function of a burst-mode demodulator, i.e., estimating parameters of the burst.

An aspect of the present invention provides nearly optimal performance for searching a signal over both time and frequency. A correlation operation may be performed between the received signal and a predetermined unique word. In the prior art brute force method discussed above, an entire received unique word is correlated over a plurality of time instances and over a plurality of frequencies. On the contrary, in accordance with the present invention, the unique word is divided into segments. Then, each segment is correlated over the plurality of time instances as a plurality of sub-correlations. The plurality of sub-correlations is then correlated over the plurality of frequencies by way of a discrete Fourier transform (DFT). Consequently, the entire unique word is only correlated once over the plurality of time instances and over the plurality of frequencies. Furthermore, the result of the phase shift and DFT performed for the sub-correlations may be considered a matrix of complex-values organized by time and frequency.

In other embodiments of the present invention, a method and system will be described for performing a magnitude calculation for the results following the performance of the DFT as described for the first embodiment and for determining time and frequency offset to provide for decoding information embedded in a received signal.

The matrix of real-valued magnitude information organized by time and frequency may be stored for processing. The stored information may be retrieved and processed. Non-limiting example of processing performed may include threshold detection and matrix operations. For determination of a matrix element with a magnitude value greater than a threshold, a time and frequency offset may be ascertained.

Further processing may include examining neighboring values of the element of the matrix with the maximum value for purposes of further refining the time and frequency offset. For a determination of significant neighboring values to the maximum value, an interpolation may be performed for ascertaining a more accurate representation for the time and frequency offset.

The resulting time and frequency offset information may be used for decoding the embedded information located within the received signal. The decoded information may be delivered for a use of some purpose.

Initial discussion will focus on explaining the time element of the present invention. The output of the correlator at time j may be described as:

$$c_j = \sum_n y_{n+j} x_n^* \quad (10)$$

Where x and y in equation (10) are generally complex-valued. The variable x may describe a sequence of predetermined symbols of a unique word and variable y may represent a received sequence of symbols. Equation (10) may describe the discrete correlation of y and x as denoted by the summation of the sequence of y multiplied by the sequence of x.

The discussion for frequency will now be considered as described by:

$$c_{j,k} = \sum_n y_{n+j} x_n^* e^{-i2\pi nkF} \quad (11)$$

For equation (11), F may describe a frequency increment, j may represent a time index and k may represent a frequency index.

The summation calculation as performed by equation (11) may be broken up into summations of smaller intervals as described by:

$$c_{j,k,l} = \sum_{n=lL-1}^{(l+1)L-1} y_{n+j} x_n^* e^{-i2\pi nkF} \quad (12)$$

For equation (12), l may represent an index over the subintervals.

The complete correlation for each time and frequency may be described as the summation over all of the smaller intervals as described by:

$$c_{j,k} = \sum_l c_{j,k,l} \quad (13)$$

The substitution of equation (12) into equation (13) may be described as:

$$c_{j,k} = \sum_l \sum_{n=lL-1}^{(l+1)L-1} y_{n+j} x_n^* e^{-i2\pi nkF} \quad (14)$$

For equation (14), l may operate as an index over the subintervals.

The length of each subinterval for equation (14), as denoted by L, may be chosen small enough such that the change in phase factor $e^{-i2\pi nkF}$ over the interval may be considered as small. Furthermore, since the contribution of the phase factor is very small for small subintervals, the phase factor may be removed from the inner summation to the outer summation as described by:

$$c_{j,k} = \sum_l e^{-i2\pi klLF} \sum_{n=lL-1}^{(l+1)L-1} y_{n+j} x_n^* \quad (15)$$

Taking into account the change in phase between the subintervals may be considered as $2\pi kLF$, equation (15) may be further simplified as described by:

$$c_{j,k} = \sum_l e^{-i2\pi klLF} c_{j,0,l} \quad (16)$$

The length of the subcorrelation, as denoted by L, may be chosen small enough such that the loss as described by equation (4) may be considered acceptably small. This approach may produce a similar result as described previously with respect to the brute force approach, albeit with a small loss as described by equation (4). Furthermore, the result of this approach may operate using a single correlator instead of a bank of correlators as used for the brute force approach.

Equation (16) has the form of a discrete Fourier transform (DFT). Thus, a DFT may be performed for the results generated from performing the subinterval correlations.

In summary, the correlation sequence x and input sequence y are divided into l segments of length L. The correlation calculation for the segments may be considered a vector of length M (i.e. $r_{xy}(j)$, j=0 . . . M−1). The DFT may be applied over the l segments for each time index j. The resulting output of the DFT may be considered a 2-dimensional complex-valued matrix over time and frequency. For signals with unknown phase, a magnitude calculation may be performed for the output of the DFT, resulting in a 2-dimensional matrix of real-valued magnitudes over time and frequency. The resulting 2-dimensional matrix may be processed dependant upon the application. For example, to find the highest correlation magnitude over time and frequency, the 2-dimensional matrix may be searched for the highest value of magnitude.

A more detailed discussion for an exemplary embodiment of the present invention will now be described with respect to FIGS. 7-15.

Figure 7:
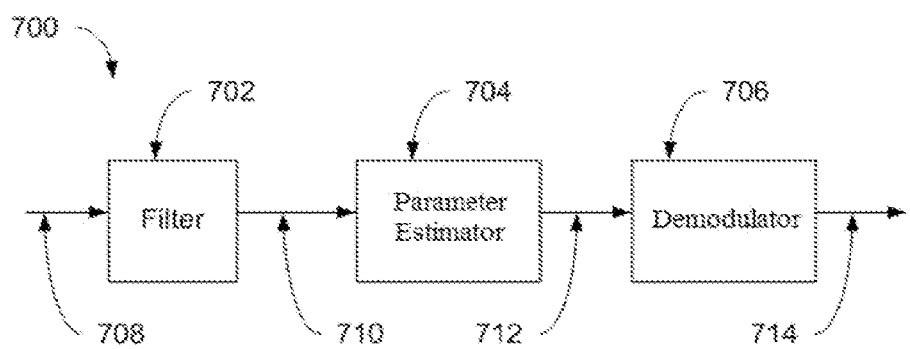
FIG. 7 illustrates a block diagram of an example communication receiver portion, in accordance with an aspect of the present invention.

FIG. 7 illustrates a block diagram of an example communication receiver portion 700, in accordance with an aspect of the present invention.

Communication receiver portion 700 includes a filter portion 702, a parameter estimator 704 and a demodulator portion 706. Each of the elements of communication receiver portion 700 are illustrated as individual devices, however, in some embodiments of the present invention at least two of filter portion 702, parameter estimator 704 and demodulator portion 706 may be combined as a unitary device.

Filter portion 702 may receive a communication signal via a communication channel 708. Parameter estimator 704 may receive information from filter portion 702 via a signal 710. Demodulator portion 706 may receive information from parameter estimator 704 via a signal 712.

Filter portion 702 may receive a communication signal via communication channel 708 and perform a filtering function or functions on the received communication signal. Non-limiting examples of filtering which may be performed include band pass, high pass and low pass.

Parameter estimator 704 may receive the filtered signal from filter portion 702 and perform a demodulation function or functions. Non-limiting examples of demodulation which may be performed include Amplitude, Frequency and Phase-shift Demodulation.

Demodulator portion 706 receives the demodulated signal from parameter estimator 704, performs processing for data recovery and receives recovered data and information via a signal 712. Non-limiting examples of processes which may be applied include mixing, correlating, delaying, matching, multiplying, performing magnitude calculations, phase shifting, performing summation calculations, performing matrix operations, performing DFT calculations, performing complex conjugate calculations and performing interpolation calculations.

Communication receiver portion 700 may receive a communication signal via communication channel 708 and process the received signal such that the transmitted signal may be recovered and transmitted via signal 714.

Figure 8:
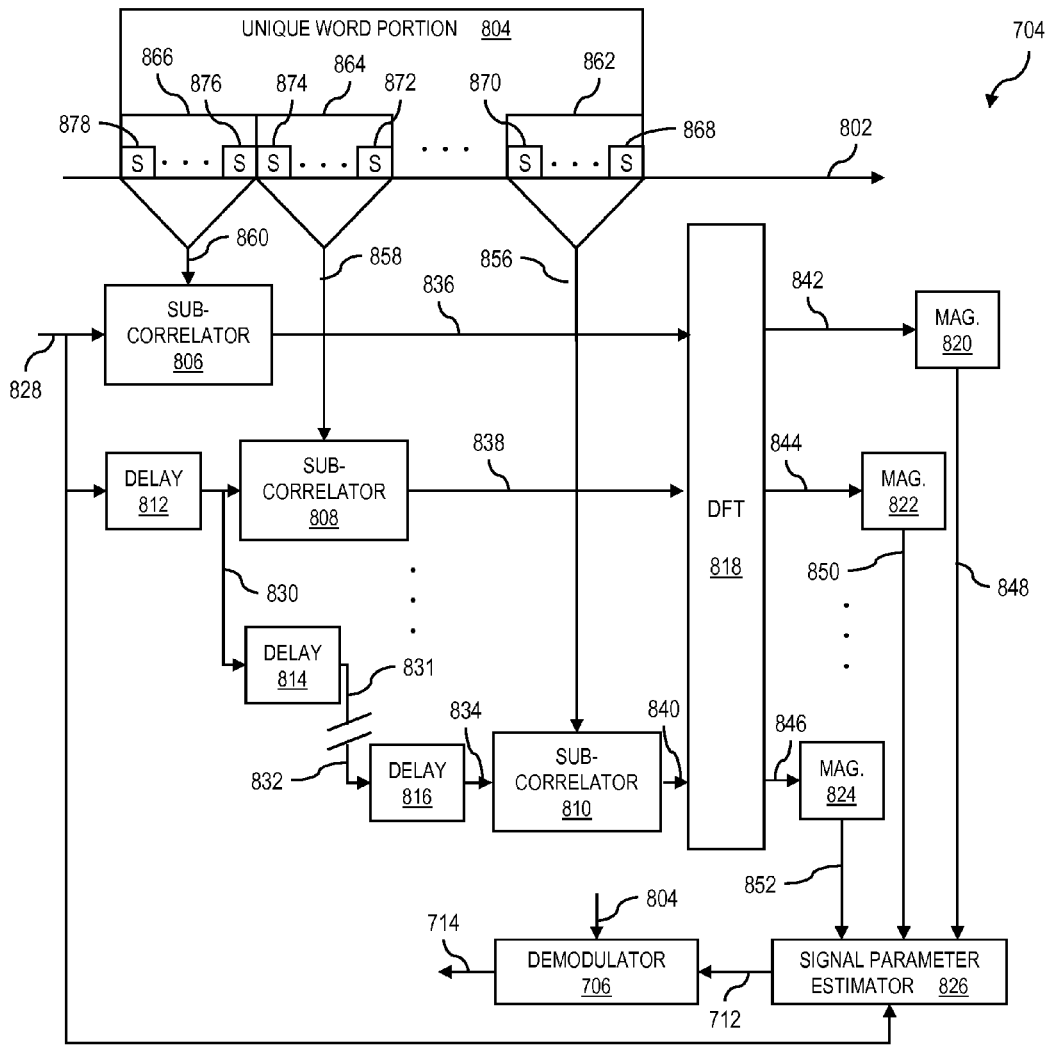
FIG. 8 illustrates a detailed version of an example data recovery portion as shown in FIG. 7, in accordance with an aspect of the present invention.

FIG. 8 illustrates a detailed version of example parameter estimator 704 and demodulator portion 706 (FIG. 7), in accordance with an aspect of the present invention.

Parameter estimator 704 includes a unique word portion 804, plurality of correlators with a sampling denoted as a sub-correlator portion 806, a sub-correlator portion 808 and a sub-correlator portion 810, a plurality of delay portions with a sampling denoted as a delay portion 812, a delay portion 814 and a delay portion 816, a DFT portion 818, a plurality of magnitude portions, with a sampling denoted as a magnitude portion 820, a magnitude portion 822 and a magnitude portion 824 and a signal parameter estimator 826. Each of the elements of parameter estimator 704 are illustrated as individual devices, however, in some embodiments of the present invention at least two of unique word portion 804, plurality of correlators with a sampling denoted as sub-correlator portion 806, sub-correlator portion 808 and sub-correlator portion 810, plurality of delay portions with a sampling denoted as delay portion 812, delay portion 814 and delay portion 816, DFT portion 818, plurality of magnitude portions, with a sampling denoted as magnitude portion 820, magnitude portion 822 and magnitude portion 824 and signal parameter estimator 826 may be combined as a unitary device.

Sub-correlator portion 806 may receive information via a signal 828 generated external to parameter estimator 704 and receive a signal 860 from unique word portion 804. Sub-correlator portion 806 may then correlate signal 828 with signal 860 to generate signal 836. Delay portion 812 may receive information via signal 828. Sub-correlator portion 808 may receive a signal 830 from delay portion 812 and a signal 858 from unique word portion 804. Sub-correlator portion 808 may then correlate signal 830 with signal 858 to generate signal 838. Delay portion 814 may receive signal 830 from delay portion 812 and provide an output signal 831 to other delay portions (not shown). Delay portion 816 may receive a signal 832 from other delay portions (not shown). Sub-correlator portion 810 may receive a signal 834 from delay portion 816 and a signal 856 from unique word portion 804. Sub-correlator portion 810 may then correlate signal 834 with signal 856 to generate signal 840. DFT portion 818 may receive a signal 836 from sub-correlator portion 806, a signal 838 from sub-correlator portion 808, a signal 840 from sub-correlator portion 810 and a plurality of signals from other sub-correlator portions (not shown). Magnitude portion 820 may receive a signal 842 from DFT portion 818. Magnitude portion 822 may receive a signal 844 from DFT portion 818. Magnitude portion 824 may receive a signal 846 from DFT portion 818. A plurality of other magnitude portions (not shown) may receive signals from DFT portion 818. Signal parameter estimator 826 may receive a signal 848 from magnitude portion 820, a signal 850 from magnitude portion 822, a signal 852 from magnitude portion 824 and a plurality of signals from other magnitude portions (not shown). Signal parameter estimator 826 may provide signal 712 for external connection from parameter estimator 704.

Unique word portion 804 includes a plurality of unique word sub-portions with a sampling denoted as a unique word sub-portion 862, a unique word sub-portion 864 and a unique word sub-portion 866. Unique word sub-portion 862 includes a plurality of symbols with a sampling denoted as a symbol 868 and a symbol 870. Unique word sub-portion 864 includes a plurality of symbols with a sampling denoted as a symbol 872 and a symbol 874. Unique word sub-portion 866 includes a plurality of symbols with a sampling denoted as a symbol 876 and a symbol 878.

Unique word portion 804 may be configured with respect to an x-axis 802 with units of time and resolution of seconds. Unique word portion 804 may represent a predetermined sequence of symbols to be received in order to perform synchronization, decoding and processing. Symbols of unique word sub-portions correspond to a relation with respect to x-axis 502 for order of transmission and arrival. For example symbol 868 of unique word sub-portion 862 may be considered the first symbol to be received for a frame of data provided from a transmitter, whereas, symbol 878 of unique word sub-portion 866 may be considered the last received symbol for the unique word portion of a frame with a payload of symbols to follow.

Sub-correlator portion 806 may receive signal 828 and perform a correlation of the received signal with the symbols received from unique word sub-portion 866. Sub-correlator portion 808 may receive a delayed signal 828 via delay portion 812 and perform a correlation of the delayed signal with the symbols provided by unique word sub-portion 864. Sub-correlator portion 810 may receive a multiply delayed signal of signal 828 via a plurality of delays and perform a correlation of the delayed received signal with the symbols provided by unique word sub-portion 862. A plurality of other correlators (not shown) may receive a plurality of delayed signals (not shown) of signal 828 via a plurality of delays (not shown) and perform a correlation of the delayed received signals with the symbols provided by unique word sub-portions (not shown).

DFT portion 818 may received the correlated signals from sub-correlator portion 806, sub-correlator portion 808 and sub-correlator portion 810 and from a plurality of other correlators (not shown) and perform a DFT operation on the received signals.

Magnitude portion 820, magnitude portion 822, magnitude portion 824 and a plurality of other magnitude portions (not shown) may receive signals from DFT portion 818 and perform a magnitude calculation on the received signals.

Signal parameter estimator 826 may receive the signals from magnitude portion 820, magnitude portion 822, magnitude portion 824 and a plurality of other magnitude portions (not shown) and perform processing functions. Non-limiting examples of the processing functions performed by signal parameter estimator 826 include threshold calculations, threshold comparisons, time related calculations, frequency related calculations, interpolation calculations and decoding operations. Signal 712 output from signal parameter estimator 826 may include estimates of parameters needed to demodulate the received signal. Non-limiting examples of parameters includes signal timing and frequency. Demodulator 706 may then use the estimates within signal 712 to demodulate unique word 804 and the payload to output signal 714.

Demodulator portion 706 may receive a signal containing information and perform correlations of sub-portions of the received signal with sub-portions of a unique word. A DFT portion may receive the results of the sub-correlation operations and perform a DFT operation. Magnitude portions may receive the results of the DFT operation and perform magnitude calculations. A data processor portion may receive the magnitude calculations and perform processing of the magnitude information to recover data information from the received signal.

Figure 9:
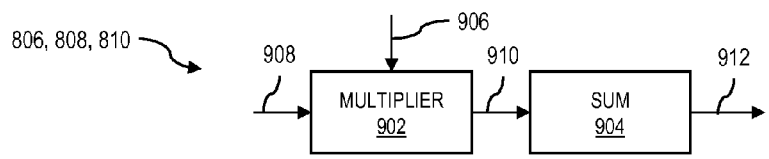
FIG. 9 illustrates a detailed version of an example sub-correlator portion as shown in FIG. 8, in accordance with an aspect of the present invention.

FIG. 9 illustrates a detailed version of example sub-corrrelator portion 806 (FIG. 8), in accordance with an aspect of the present invention.

Sub-correlator portion 808 (FIG. 8), sub-correlator portion 810 (FIG. 8) and a plurality of sub-correlator portions (not shown) may also be described by the illustration of FIG. 9.

Sub-correlator portion 806 includes a multiplier portion 902 and a summation portion 904. Each of the elements of sub-correlator portion 806 are illustrated as individual devices, however, in some embodiments of the present invention at least two of multiplier portion 902 and summation portion 904 may be combined as a unitary device.

Multiplier portion 902 may receive a data signal 906 and a unique word signal 908 generated external to sub-correlator portion 810. Summation portion 904 may receive a signal 910 from multiplier portion 902 and provide a signal 912 for external connection from sub-correlator portion 806.

Multiplier portion 902 may perform a multiplication operation of information received from data signal 906 with information received from unique word signal 908. Summation portion 904 may receive the multiplication information generated by multiplier portion 902 and perform a summation operation.

Sub-correlator portion 806 may receive data information and unique word information and perform a multiplication of the received information. Furthermore, sub-correlator portion 806 may perform a summation calculation for the information generated from the multiplication operation.

Figure 10:
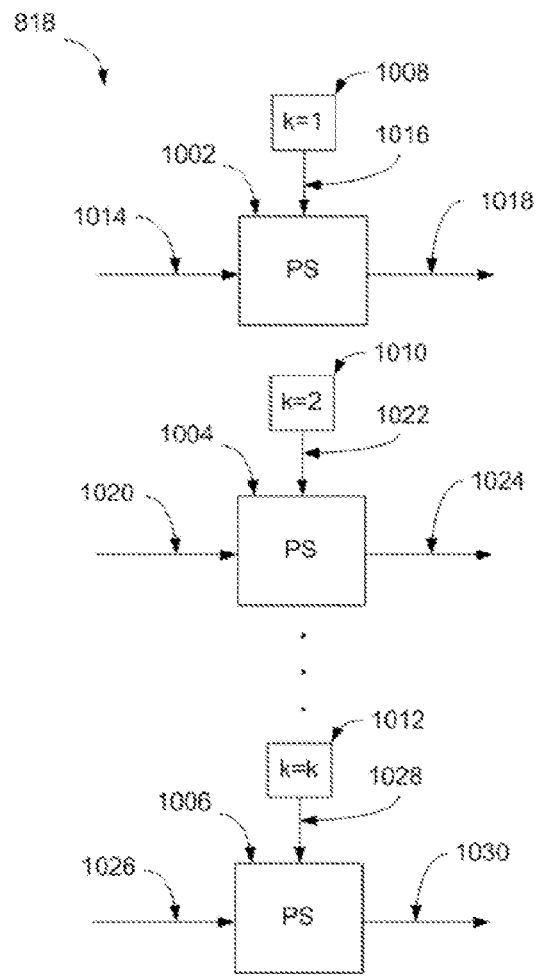
FIG. 10 illustrates a detailed version of an example digital Fourier transform DFT portion as shown in FIG. 8, in accordance with an aspect of the present invention.

FIG. 10 illustrates a detailed version of example DFT portion 818 (FIG. 8), in accordance with an aspect of the present invention.

DFT portion 818 includes a plurality of phase-shift portions, with a sampling denoted as a phase-shift portion 1002, a phase-shift portion 1004, a phase-shift portion 1006, a plurality of phase-shift coefficients, with a sampling denoted as a phase-shift coefficient 1008, a phase-shift coefficient 1010 and a phase-shift coefficient 1012. Each of the elements of DFT portion 818 are illustrated as individual devices, however, in some embodiments of the present invention at least two of phase-shift portion 1002, phase-shift portion 1004, phase-shift portion 1006, a plurality of phase-shift coefficients, with a sampling denoted as phase-shift coefficient 1008, phase-shift coefficient 1010 and phase-shift coefficient 1012 may be combined as a unitary device.

Phase-shift portion 1002 may receive a signal 1014 generated from external to DFT portion 818, receive a phase-shift coefficient from phase-shift coefficient 1008 via a signal 1016 and provide a signal 1018 for connection external to DFT portion 818. Phase-shift portion 1002 may receive a signal 1020 from generated external to OFT portion 818, receive a phase-shift coefficient from phase-shift coefficient 1010 via a signal 1022 and provide a signal 1024 for connection external to DFT portion 818. Phase-shift portion 1006 may receive a signal 1026 generated from external to DFT portion 818, receive a phase-shift coefficient from phase-shift coefficient 1012 via a signal 1028 and provide a signal 1030 for connection external to DFT portion 818. A plurality of phase-shift portions (not shown) may receive a plurality of signals generated from external to DFT portion 818 (not shown), may receive a plurality of phase-shift coefficients from a plurality of phase-shift coefficient portions (now shown) via a plurality of signals (now shown) and provide a plurality of signals (not shown) for connection external to OFT portion 818.

Phase-shift portion 1002, phase-shift portion 1004, phase-shift portion 1006 and a plurality of phase-shift portions (not shown) may perform a phase shift as denoted by a received phase-shift coefficient, perform a DFT for a received signal and deliver the results of the combined phase-shift and DFT operation external to OFT portion 818.

DFT portion 818 may receive a plurality of signals delivering sub-correlations performed between sub-signals and unique word sub-portions. Furthermore, a plurality of differing phase shift operations and DFT operations may be applied to the received sub-correlations for generating a plurality of signals 842, 844 and 846.

Figure 11:
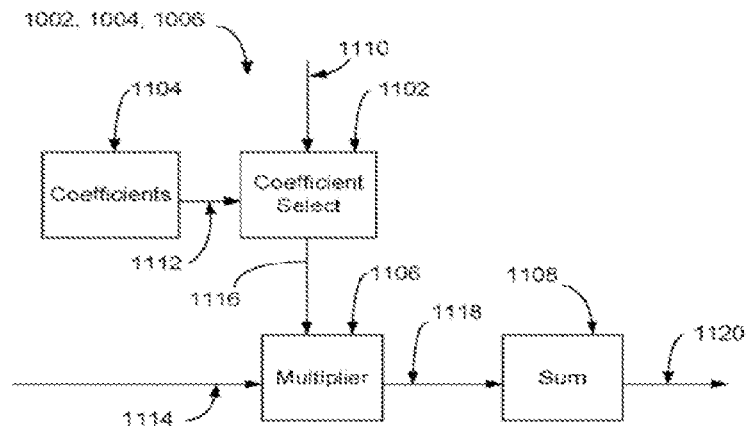
FIG. 11 illustrates a detailed version of an example phase-shift portion as shown in FIG. 10, in accordance with an aspect of the present invention.

FIG. 11 illustrates a detailed version of example phase-shift portion 1002 (FIG. 10), in accordance with an aspect of the present invention.

Phase-shift portion 1004 (FIG. 10), phase-shift portion 1006 (FIG. 10) and a plurality of phase-shift portions (not shown) may also be described by the illustration of FIG. 11.

Phase-shift portion 1002 includes a coefficient select portion 1102, a coefficients portion 1104, a multiplier portion 1106 and a summation portion 1108. Each of the elements of phase-shift portion 1002 are illustrated as individual devices, however, in some embodiments of the present invention at least two of coefficient select portion 1102, coefficients portion 1104, multiplier portion 1106 and summation portion 1108 may be combined as a unitary device.

Coefficient select portion 1102 may receive a signal 1110 generated external to phase-shift portion 1002 and may receive a signal 1112 from coefficients portion 1104. Multiplier portion 1106 may receive a signal 1114 generated external to phase-shift portion 1002 and a signal 1116 from coefficient select portion 1102. Summation portion 1108 may receive a signal 1118 from multiplier portion 1106 and generate a signal 1120 for delivery external to phase-shift portion 1002.

Coefficient select portion 1102 may receive a coefficient indication from external to phase-shift portion 1002 for selecting a group of coefficients from coefficients portion 1104 for delivery to multiplier portion 1106. Multiplier portion 1106 may receive the selected group of coefficients from coefficient select portion 1102 and receive a sub-correlation calculation generated external to phase-shift portion 1002 and perform a multiplication of the received signal with the selected group of coefficients. Summation portion 1108 may receive the multiplication calculation performed by multiplier portion 1106 and provide the summation result external to phase-shift portion 1002.

Figure 12:
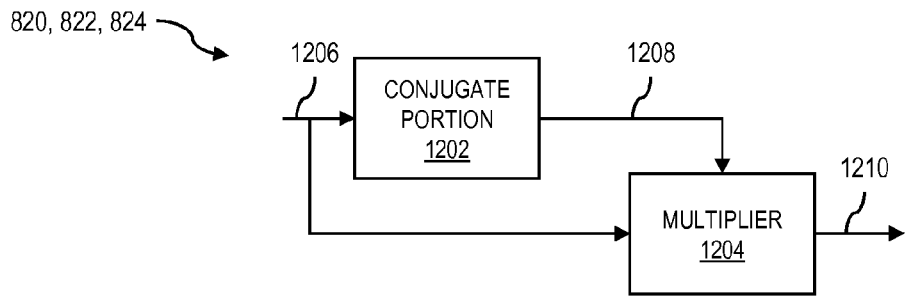
FIG. 12 illustrates a detailed version of an example magnitude portion as shown in FIG. 8, in accordance with an aspect of the present invention.

FIG. 12 illustrates a detailed version of example magnitude portion 820 (FIG. 8), in accordance with an aspect of the present invention.

Magnitude portion 822 (FIG. 8), magnitude portion 824 (FIG. 8) and a plurality of magnitude portions (not shown) may also be described by the illustration of FIG. 12.

Magnitude portion 822 includes a complex conjugate portion 1202 and a multiplier portion 1204. Each of the elements of magnitude portion 822 are illustrated as individual devices, however, in some embodiments of the present invention at least two of complex conjugate portion 1202 and multiplier portion 1204 may be combined as a unitary device.

Complex conjugate portion 1202 may receive a signal 1206 generated external to magnitude portion 822. Multiplier portion 1204 may receive signal 1206 generated external to magnitude portion 822, a signal 1208 from complex conjugate portion 1202 and provide a signal 1210 for delivery external to complex conjugate portion 1202.

Magnitude portion 822 may receive a signal generated from external to magnitude portion 822, perform a complex conjugate operation for the received signal, perform a multiplication operate of the received signal and the complex conjugate calculation to generate a magnitude calculation for the received signal. Furthermore, the magnitude calculation may be provided for delivery external to magnitude portion 822.

As an example, magnitude portion 822 may receive a value of (2+j3) in order to determine the magnitude. Complex conjugate portion 1202 may calculate the complex conjugate for (2+j3) denoted as (2−j3). Multiplier portion 1204 may then multiply (2+j3)*(2−j3) and generate a magnitude value of 13 for delivery external to magnitude portion 822.

Figure 13:
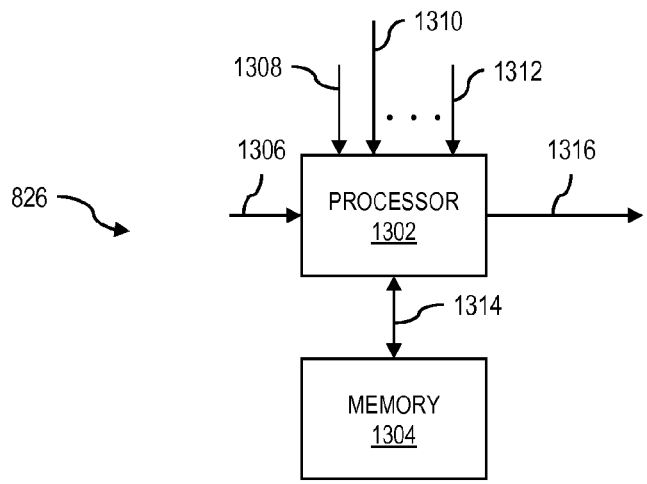
FIG. 13 illustrates a detailed version of an example data processor as shown in FIG. 8, in accordance with an aspect of the present invention.

FIG. 13 illustrates a detailed version of example signal parameter estimator 826 (FIG. 8), in accordance with an aspect of the present invention.

Signal parameter estimator 826 includes a processor portion 1302 and a memory portion 1304. Each of the elements of signal parameter estimator 826 are illustrated as individual devices, however, in some embodiments of the present invention at least two of processor portion 1302 and memory portion 1304 may be combined as a unitary device.

Processor portion 1302 may receive a plurality of signals containing magnitude information, with a sampling denoted as a signal 1308, a signal 1310 and a signal 1312, and receive a signal 1306 containing information for decoding. Processor portion 1302 may communicate bi-directionally with memory via a communication channel 1314.

Processor portion 1302 may receive the plurality of signals containing magnitude information and store the magnitude information in memory portion 1304. Processor may retrieve magnitude information from memory portion 1304 for processing. Processor portion 1302 may perform threshold calculations and comparisons for the magnitude information in order to determine the receipt and match for a unique word. Furthermore, processor portion 1302 may use the determination of a unique word match for determining synchronization information and phase information for decoding information received via signal 1306 for deliver external to signal parameter estimator 826 via a signal 1316.

Non-limiting examples of the processing functions performed by signal parameter estimator 826 include threshold calculations, threshold comparisons, time related calculations, frequency related calculations, interpolation calculations and decoding operations.

Figure 14:
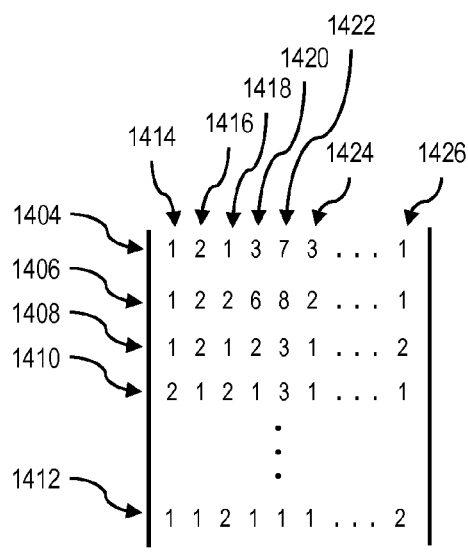
FIG. 14 illustrates an example matrix of magnitude information as calculated by a data recovery portion as shown in FIGS. 7-8, in accordance with an aspect of the present invention.

FIG. 14 illustrates an example matrix 1402 of magnitude information as calculated by example parameter estimator 704 (FIGS. 7-8), in accordance with an aspect of the present invention.

Matrix 1402 includes a plurality of row information with a sampling denoted as a row 1404, a row 1406, a row 1408, a row 1401 and a row 1412 and a plurality of column information with a sampling denoted as a column 1414, a column 1416, a column 1418, a column 1420, a column 1422, a column 1424 and a column 1426.

The rows of matrix 1402 may be organized by frequency offset as determined by a plurality of phase-shill coefficients with a sampling denoted, referring to FIG. 10, as phase-shift coefficient 1008, phase-shift coefficient 1010 and phase-shift coefficient 1012. The columns of matrix 1402 may be organized with respect to time with the information depicted in column 1414 as being received prior to information received in other columns and with the information depicted in column 1426 as being received after information received in other columns.

The magnitude information as depicted in matrix 1402 may indicate a frequency offset and moment of time for synchronization with an expected unique word for a received signal. For example, the largest value of magnitude as depicted in matrix 1402 is the value of eight located at the intersection of row 1406 and column 1422. For this example, the time and frequency offset may be determined as being with respect to the frequency offset of row 1406 and with respect to the timing of column 1422.

Furthermore, the exact time and frequency for synchronization may not occur at exactly the intersection of row 1406 and column 1422. A case of inexact synchronization may be observed by significant, but lower magnitude, values located adjacent to the largest magnitude value. For example, the next largest magnitude values of matrix 1402 are located in adjacent positions to the largest magnitude value of 8. The significant but lesser magnitude values may be observed as a value of 7 located at the intersection of row 1404 and column 1422 and by a value 6 located at the intersection of row 1406 and column 1420. A more accurate representation for the time and frequency for synchronization may be determined by performing an interpolation calculation between the largest value of magnitude and lesser valued adjacent magnitude values. For example, the true frequency offset may be considered as between the frequency offset as denoted by column 1422 and column 1420 and the true time offset may be considered as between the time offset as denoted by row 1404 and row 1406.

Figure 15A:
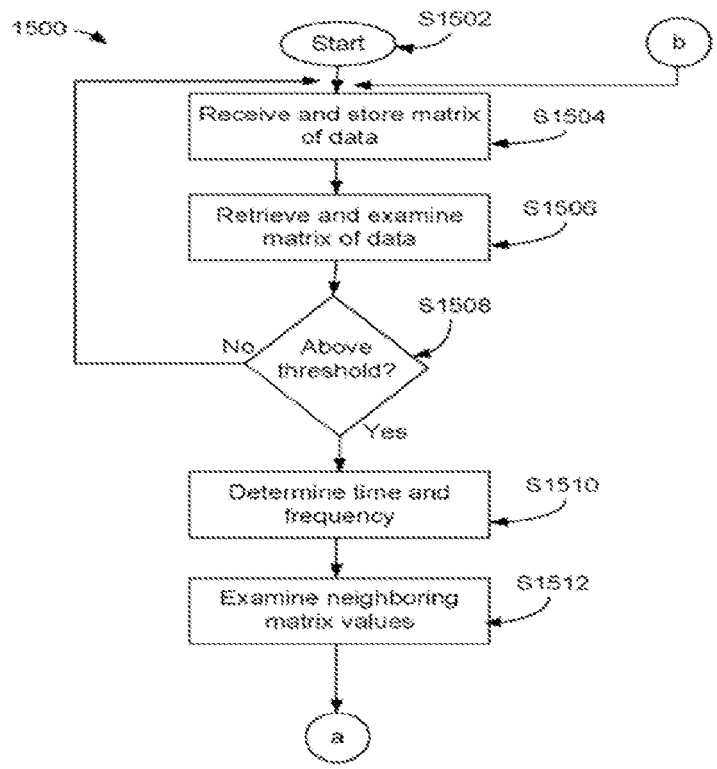
FIGS. 15A-B illustrate an example method for operation of a data processor as shown in FIG. 8 and FIG. 13, in accordance with an aspect of the present invention.
Figure 15B:
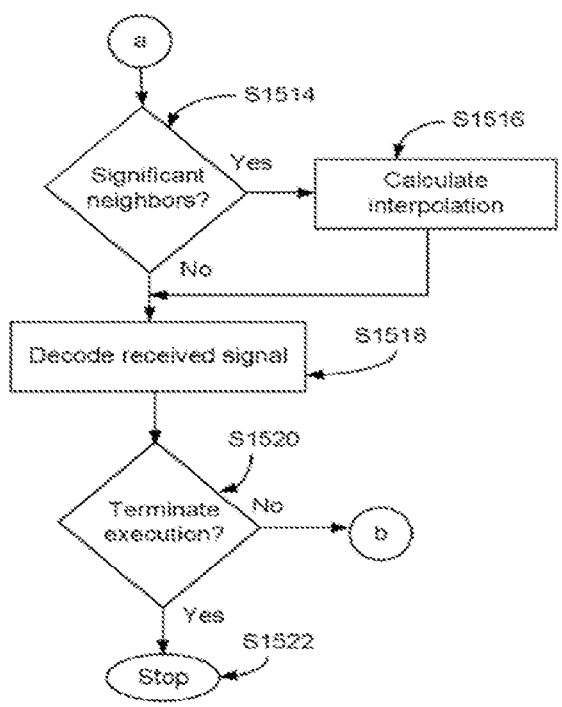

FIGS. 15A-B illustrate an exemplary method 1500 for operation of signal parameter estimator 826, in accordance with an aspect of the present invention.

Starting with FIG. 15A, in the example embodiment, method 1500 starts (S1502) and signal parameter estimator 826 may receive and store a matrix of information as depicted, by the exemplary embodiment as illustrated in FIG. 14 (S1504).

Returning to FIG. 13, processor portion 1302 may receive magnitude information via a plurality of signals with a sampling denoted as signal 1308, signal 1310 and signal 1312. Processor portion 1302 may then store received magnitude information in memory portion 1304 via communication channel 1314.

Matrix of magnitude information may be retrieved and examined by processor portion 1302 (S1506).

Processor portion 1302 may retrieve matrix of magnitude information from memory portion 1304 via communication channel 1314 and examine the elements of the retrieved matrix for magnitude elements of the matrix exceeding a predetermined threshold.

For a determination of not finding a value of the matrix greater than the predetermined threshold, execution of method 1500 returns to receiving and storing matrix information (S1504).

For a determination of finding a value of the matrix greater than the predetermined threshold (S1508), a determination for the frequency offset and time offset is made (S1510) based upon the respective row and column of the matrix for an element or elements exceeding the predetermined threshold.

For example, returning to FIG. 14, the magnitude value of 8 located as the cross section of row 1406 and column 1422, as depicted in exemplary matrix 1402, may be considered as having the maximum value of all of the elements of the matrix and surpassing a threshold value of 5. Furthermore, the frequency offset may be determined approximately as being with respect to row 1406 and the time offset may be determined approximately as being with respect to column 1422.

After determining a maximum magnitude for a matrix of information, the magnitude of neighboring elements to the maximum magnitude for the matrix may be examined for significance in order to determine if a more accurate estimate for the time and frequency offset may be ascertained (S1512).

As illustrated in FIG. 15B, for a determination of significant neighboring elements of the maximum magnitude value (S1514), an interpolated value for the time and/or frequency offset may be calculated (S1516).

For example, returning to FIG. 14, the magnitude value of 7 located at the cross section of row 1404 and column 1422 may be considered greater than a threshold of 5. Furthermore, the magnitude value of 6 located at the cross section of row 1406 and column 1420 may be considered greater than a threshold of 5. Based on this a more accurate approximation for the frequency offset may be determined via interpolation as being located between the frequency as indicated by row 1404 and row 1406. Furthermore, a more accurate approximation for the time offset may be determined via interpolation as being located between the time as indicated by column 1420 and column 1422. Any known method for interpolation calculation may be used for determining more accurate approximations for the time and frequency offset.

After determining a time and frequency offset, the received signal may be processed for decoding the embedded symbols (S1518).

Figure 2:
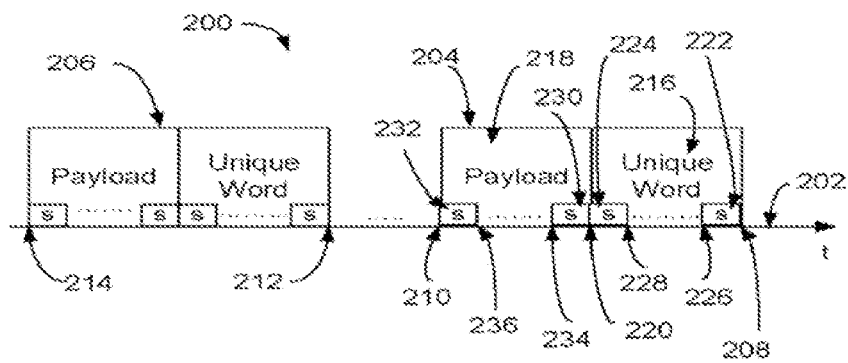
FIG. 2 illustrates a conventional transmission of a communications protocol by a transmitter as shown in FIG. 1.
Figure 3:
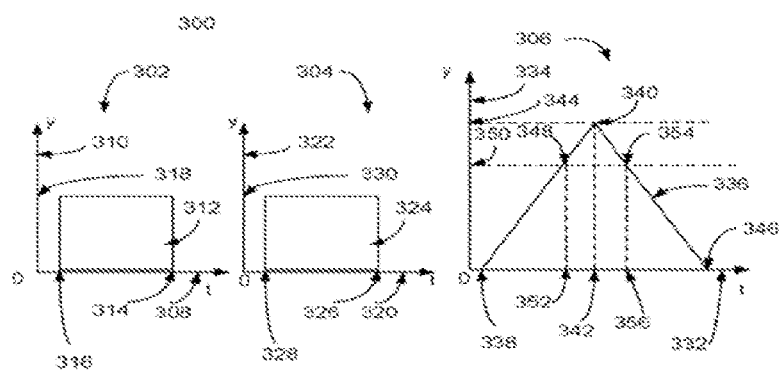
FIG. 3 illustrates a conventional continuous correlation operation.
Figure 4:
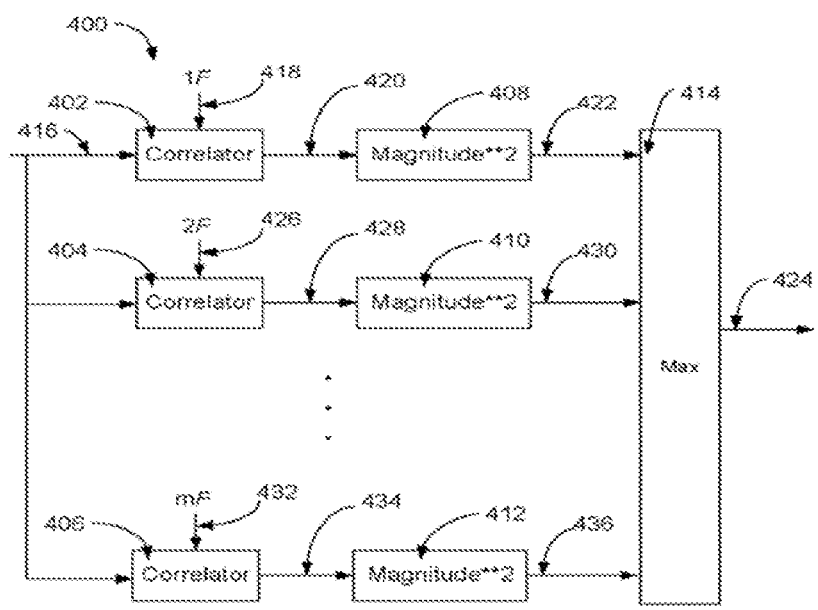
FIG. 4 illustrates a block diagram of a conventional brute force receiver portion.
Figure 6:
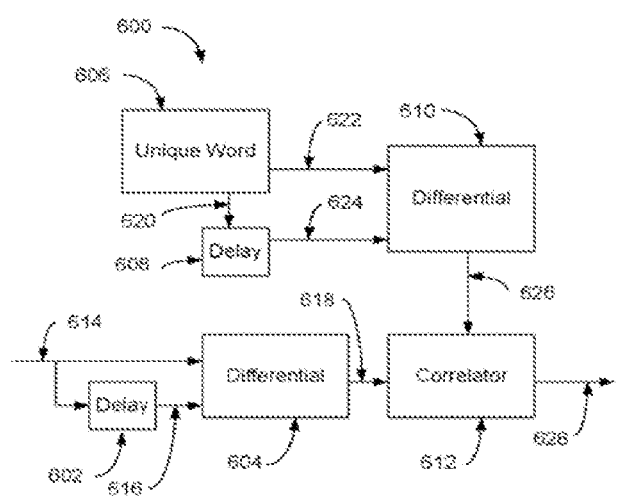
FIG. 6 illustrates a block diagram of a conventional differential detection receiver portion.
Figure 5:
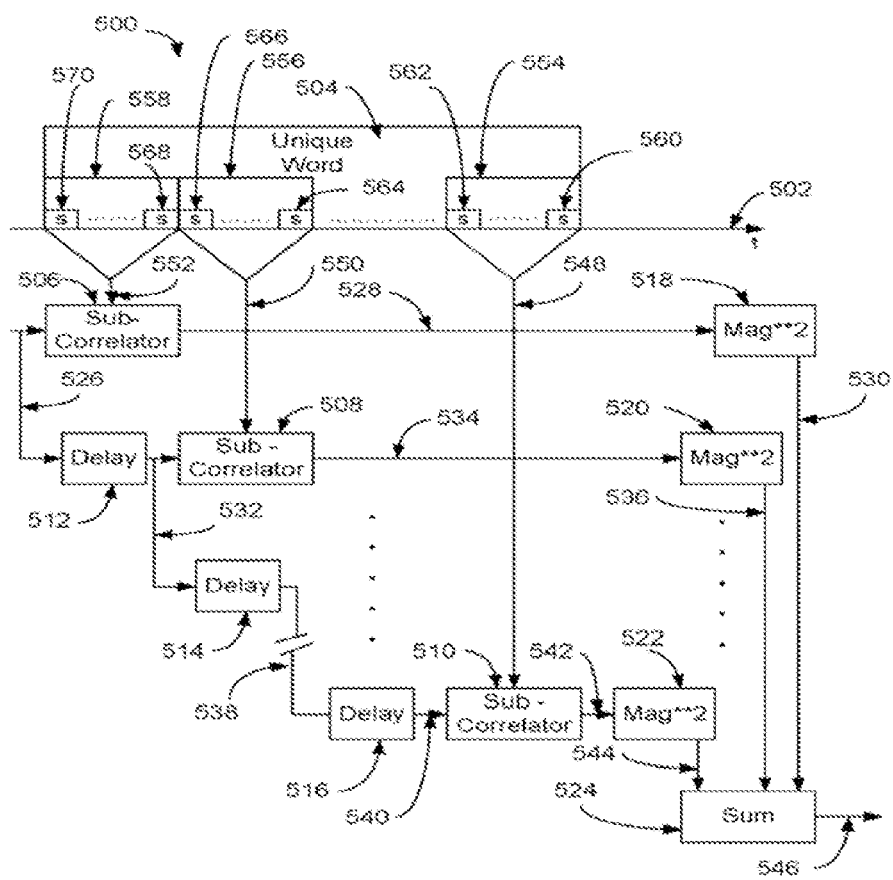
FIG. 5 illustrates a block diagram of a conventional non-coherent receiver portion.

For example, returning to FIG. 2, consider frame 204. The starting time of frame 204, as denoted by time 208, may be determined, as well as any frequency offset. Using the time and frequency information derived from processing unique word 216, signal parameter estimator 826, as illustrated in FIG. 8, may determine the start time of payload 218, as denoted by time 220. Furthermore, signal parameter estimator 826 may determine the starting time and frequency offset for each symbol of payload 218. Furthermore, having determined the starting time and frequency offset for each symbol, signal parameter estimator 826 may determine the value of each symbol resident within payload 218. Furthermore, signal parameter estimator 826 may transmit decode information external to communication receiver portion 700.

After decoding information embedded in a signal, it may be determined whether method 1500 continues execution (S1520).

For a determination of continuation of method 1500, execution of method 1500 returns to receiving and storing matrix information (S1504) (FIG. 15A).

For a determination of cessation of method 1500, method 1500 terminates (S1522) (FIG. 15B).

A data processor may receive a matrix of magnitude information, store information, retrieve information, process information, examine information, determine a time and frequency offset, perform interpolation operations to determine a more accurate representation of the time and frequency offset and use time and frequency offset to perform processing and decoding of information embedded within a received signal.

In accordance with an aspect of the present invention, a system and method has been described for receiving an encoded signal containing impairments and for providing filtering, demodulation and processing for the near optimal recovery of the encoded information embedded within the received signal.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method comprising:
    receiving a data communications signal;
    correlating the received signal with a predetermined bit sequence, at a one instant in time, over a plurality of predetermined frequency offsets; and
    performing a signal parameter estimation function, to determine a highest correlation value, for the received signal over the predetermined frequency offsets, based on a matrix of final correlation factors;
    wherein the correlation of the received signal with the predetermined bit sequence, over the plurality of predetermined frequency offsets, comprises:
        correlating, at the one time instant, each of a number of successive sub-segments of the received signal with a corresponding one of a number of successive sub-segments of the predetermined bit sequence, while disregarding a change in phase factor within each segment of the received signal, to generate a respective correlation factor associated with each sub-segment of the received signal for the one time instant; and
        coherently combining, for each frequency offset, the correlation factors over the sub-segments of the received signal, to generate a final correlation factor for each frequency offset over the sub-segments of the received signal, by: applying, to each correlation factor, a respective phase shift associated with each of the predetermined frequency offsets, to generate a respective set of frequency adjusted correlation factors for each frequency offset, with each being associated with the respective correlation factor and associated sub-segment of the received signal; and combining, for each frequency offset, the frequency adjusted correlation factors of the respective set, to generate the final correlation factor for each frequency offset over the sub-segments of the received signal, resulting in the matrix of final correlation factors over the predetermined frequency offsets, and wherein the correlation of the received signal with the predetermined bit sequence is further performed over a plurality of instants in time, resulting in a matrix of final correlation factors over the predetermined frequency offsets and over the instants in time, and wherein the correlation of the received signal with the predetermined bit sequence, over the plurality of predetermined frequency offsets and over the plurality of instants in time, is reflected as:

$$c_{j,k} = \sum_l e^{-i2\pi k l L F} c_{j,0,l}$$

where $$c_{j,0,l} = \sum_{n=lL-1}^{(l+1)L-1} y_{n+j} x_n^*$$

where x reflects a sequence of symbols of the predetermined bit sequence, y reflects a sequence of symbols of the received signal, j reflects a time index, k reflects a frequency index, l reflects the number of sub-segments of the received signal, L reflects a length of each of the sub-segments of the received signal, and F reflects a frequency increment of the predetermined frequency offsets.

2. The method of claim 1, wherein the correlation of the received signal with the predetermined bit sequence further comprises applying a magnitude function to the matrix of final correlation factors, to generate a matrix of respective magnitude values over the predetermined frequency offsets and over the instants in time, wherein the performing of the signal parameter estimation function is based on the matrix of magnitude values.

3. The method of claim 1, wherein the correlation of the received signal with the predetermined bit sequence comprises application of a discrete Fourier transform (DFT) to the results of the correlation of each of the number of successive sub-segments of the received signal with the corresponding one of the number of successive sub-segments of the predetermined bit sequence, applied over the l segments for each time index j, wherein the matrix of final correlation factors comprises a two-dimensional complex-valued matrix over the plurality of predetermined frequency offsets and over the plurality of instants in time.

4. The method of claim 3, wherein the correlation of the received signal with the predetermined bit sequence further comprises applying a magnitude function to the output of the DFT, to generate a two-dimensional matrix of real-valued magnitudes over the plurality of predetermined frequency offsets and over the plurality of instants in time, wherein the performing of the signal parameter estimation function is based on the matrix of real-valued magnitudes.

5. An apparatus comprising:
a correlator module configured to correlate a received data communications signal with a predetermined bit sequence, at a one instant in time, over a plurality of predetermined frequency offsets;
a signal parameter estimation module configured to determine a highest correlation value, for the received signal over the predetermined frequency offsets, based on a matrix of final correlation factors;
wherein the correlator module is configured to correlate the received data communications signal with the predetermined bit sequence, at the one instant in time, over the plurality of predetermined frequency offsets, by:
correlating, at the one time instant, each of a number of successive sub-segments of the received signal with a corresponding one of a number of successive sub-segments of the predetermined bit sequence, while disregarding a change in phase factor within each segment of the received signal, to generate a respective correlation factor associated with each sub-segment of the received signal for the one time instant; and
coherently combining, for each frequency offset, the correlation factors over the sub-segments of the received signal, to generate a final correlation factor for each frequency offset over the sub-segments of the received signal, by: applying, to each correlation factor, a respective phase shift associated with each of the predetermined frequency offsets, to generate a respective set of frequency adjusted correlation factors for each frequency offset, with each being associated with the respective correlation factor and associated sub-segment of the received signal; and combining, for each frequency offset, the frequency adjusted correlation factors of the respective set, to generate the final correlation factor for each frequency offset over the sub-segments of the received signal, resulting in the matrix of final correlation factors over the predetermined frequency offsets, and
wherein the correlator module is further configured to correlate the received signal with the predetermined bit sequence over a plurality of instants in time, resulting in a matrix of final correlation factors over the predetermined frequency offsets and over the instants in time, and
wherein the correlation of the received signal with the predetermined bit sequence, over the plurality of predetermined frequency offsets and over the plurality of instants in time, is reflected as:

$$c_{j,k} = \sum_l e^{-i2\pi k l L F} c_{j,0,l}$$

where $$c_{j,0,l} = \sum_{n=lL-1}^{(l+1)L-1} y_{n+j} x_n^*$$

where x reflects a sequence of symbols of the predetermined bit sequence, y reflects a sequence of symbols of the received signal, j reflects a time index, k reflects a frequency index, l reflects the number of sub-segments of the received signal, L reflects a length of each of the sub-segments of the received signal, and F reflects a frequency increment of the predetermined frequency offsets.

6. The apparatus of claim 5, wherein the correlator module is further configured to correlate the received data communications signal with the predetermined bit sequence by further applying a magnitude function to the matrix of final correlation factors, to generate a matrix of magnitude values over the predetermined frequency offsets and over the instants in time, wherein the signal parameter estimation module is configured to determine the highest correlation value based on the matrix of magnitude values.

7. The apparatus of claim 5, wherein the correlator module is further configured to correlate the received data communications signal with the predetermined bit sequence via application of a discrete Fourier transform (DFT) to the results of the correlation of each of the number of successive sub-segments of the received signal with the corresponding one of the number of successive sub-segments of the predetermined bit sequence, applied over the l segments for each time index j, wherein the matrix of final correlation factors comprises a two-dimensional complex-valued matrix over the plurality of predetermined frequency offsets and over the plurality of instants in time.

8. The apparatus of claim 7, wherein the correlator module is further configured to correlate the received data communications signal with the predetermined bit sequence by further applying a magnitude function to the output of the DFT, to generate a two-dimensional matrix of real-valued magnitudes over the plurality of predetermined frequency offsets and over the plurality of instants in time, wherein the signal parameter estimation module is configured to determine the highest correlation value based on the matrix of real-valued magnitudes.

* * * * *